United States Patent [19]
Kato et al.

[11] 4,051,583
[45] Oct. 4, 1977

[54] MACHINE TOOL WITH A TURRET HEAD FOR TOOL SPINDLES

[75] Inventors: Shiro Kato, Kariya; Yasuhiro Hattori, Nagoya, both of Japan

[73] Assignee: Toyoda-Koki Kabushiki-Kaisha, Japan

[21] Appl. No.: 668,862

[22] Filed: Mar. 22, 1976

[30] Foreign Application Priority Data

Apr. 28, 1975 Japan .................................. 50-51687

[51] Int. Cl.² ........................................... B23B 39/20
[52] U.S. Cl. ........................................ 29/40; 29/568; 90/11 A; 408/35
[58] Field of Search ............... 90/11 A; 29/26 A, 568, 29/40; 408/35

[56] References Cited

U.S. PATENT DOCUMENTS

| 3,259,976 | 7/1966 | Bergstrom et al. | 29/568 |
| 3,292,235 | 12/1966 | Riedel | 29/26 A |
| 3,604,083 | 9/1971 | Antonietto et al. | 29/568 X |

FOREIGN PATENT DOCUMENTS

| 47-29032 | 12/1969 | Japan | 408/35 |

Primary Examiner—Othell M. Simpson
Assistant Examiner—Z. R. Bilinsky
Attorney, Agent, or Firm—Oblon, Fisher, Spivak, McClelland & Maier

[57] ABSTRACT

A machine tool having a frame, a turret head rotatably mounted upon the frame, at least one tool spindle rotatably supported within the turret head, first coupling means mounted upon the tool spindle, and second coupling means slidably and rotatably mounted within the frame and adapted to engage with the first coupling means of the tool spindle positioned at an operative position so as to transmit a driving power to the tool spindle. Within the turret head there is mounted angular maintenance means for maintaining the tool spindle in a first predetermined angular position. Within the frame there are mounted release means for releasing the tool spindle positioned at the operative position from the angular maintenance means, orienting means for positioning the second coupling means to a second predetermined angular position, and means for moving the second coupling means positioned at the second predetermined angular position into and out of engagement with the first coupling means.

7 Claims, 3 Drawing Figures

MACHINE TOOL WITH A TURRET HEAD FOR TOOL SPINDLES

BACKGROUND OF THE INVENTION

1. Field of the Invention

The present invention relates generally to a machine tool and more particularly to an improved machine tool provided with a turret head rotatably supporting a plurality of tool spindles.

2. Description of the Prior Art

In a machine tool having a frame, a turret head rotatably mounted upon the frame, and a plurality of tool spindles rotatably supported within the turret head, each of the tool spindles being capable of being positioned at an operative position by the indexing movement of the turret head, generally rotating motion of the tool spindle positioned at the operative position may be performed by means of power drive means carried by the frame and coupling means which includes first coupling means mounted upon each tool spindle and second coupling means mounted within the frame and adapted to engage with the first coupling means of the tool spindle positioned at the operative position. It does not always follow that the first coupling means engages with the second coupling means in a fixed angular relationship to each other.

Accordingly, in order to perform the angular positioning of the tool spindle positioned at the operative position, an angular positioning mechanism, such as a set of notch and plunger, for the exclusive use of each of the tool spindles, has to be mounted within the turret head so as to directly position the respective tool spindle. In the conventional machine tool, a plurality of actuators, such as cylinder mechanisms, for actuating the respective angular positioning mechanisms had been mounted within the turret head, which had resulted in the disadvantages that the turret head becomes large in size and hydraulic circuits for conducting hydraulic fluid from a pump provided within the frame to the cylinder mechanisms become complicated because the turret head is rotatable in relation to the frame.

Moreover, the first and second coupling means generally include toothed coupling members. Such first and second coupling means are incapable of engaging with each other with only a relative axial shifting therebetween, because of teeth thereof butting against each other. Therefore, to perform engagement with each other, there is need for a relative angular inching therebetween. As a result, more time is required to perform engagement between the toothed coupling members and the toothed coupling members are subject to damage due to the butting.

SUMMARY OF THE INVENTION

It is therefore an object of the present invention to provide an improved turret type machine tool wherein an angular positioning mechanism mounted within the turret head for the exclusive use of each of the tool spindles is selectively operated by only one actuator mechanism mounted within the frame.

Another object of the present invention is to provide an improved turret type machine tool wherein transmitting the operative power from the actuator mechanism mounted within the frame to the angular positioning mechanisms mounted within the turret head is accomplished with mechanical means.

Another object of the present invention is to provide an improved turret type machine tool wherein engagement between first and second coupling members for transmitting a driving power to the tool spindle is effected without the necessity of inching motion.

A further object of the present invention is to provide an improved turret type machine tool wherein the angular positioning mechanism and the second coupling member are simultaneously operated by only one actuator mechanism.

According to the present invention the foregoing and other objects are attained by a machine tool which comprises a frame, a turret head rotatably mounted upon the frame, at least one tool spindle rotatably supported within the turret head, indexing means for indexing the turret head relative to the frame to position the tool spindle to an operative position, first coupling means mounted upon the tool spindle, second coupling means slidably and rotatably mounted within the frame and adapted to engage with the first coupling means of the tool spindle positioned at the operative position to transmit a driving power to the tool spindle, a first engaging member mounted upon the tool spindle, a second engaging member slidably mounted within the turret head and adapted to engage with the first engaging member for maintaining the tool spindle at a first predetermined angular position, resilient means mounted within the turret head for urging the second engaging member into engagement with the first engaging member, orienting means operatively connected to position the second coupling means to a second predetermined angular position, release means mounted within the frame for moving the second engaging member out of engagement with the first engaging member of the tool spindle positioned at the operative position, and means operatively connected to the second coupling means for moving the second coupling means positioned at the second predetermined angular position into engagement with the first coupling means of the tool spindle maintained at the first predetermined angular position and for moving the second coupling means positioned at the second predetermined angular position out of engagement with the first coupling means to permit engagement of the second engaging member with the first engaging member.

BRIEF DESCRIPTION OF THE DRAWINGS

Other objects, features and attendant advantages of the present invention will be more fully appreciated as the same becomes better understood from the following detailed description of a preferred embodiment of the invention, when considered in connection with the accompanying drawings, in which like reference numerals designate like or corresponding parts and wherein.

DETAILED DESCRIPTION OF THE PREFERRED EMBODIMENT

Figure 1:
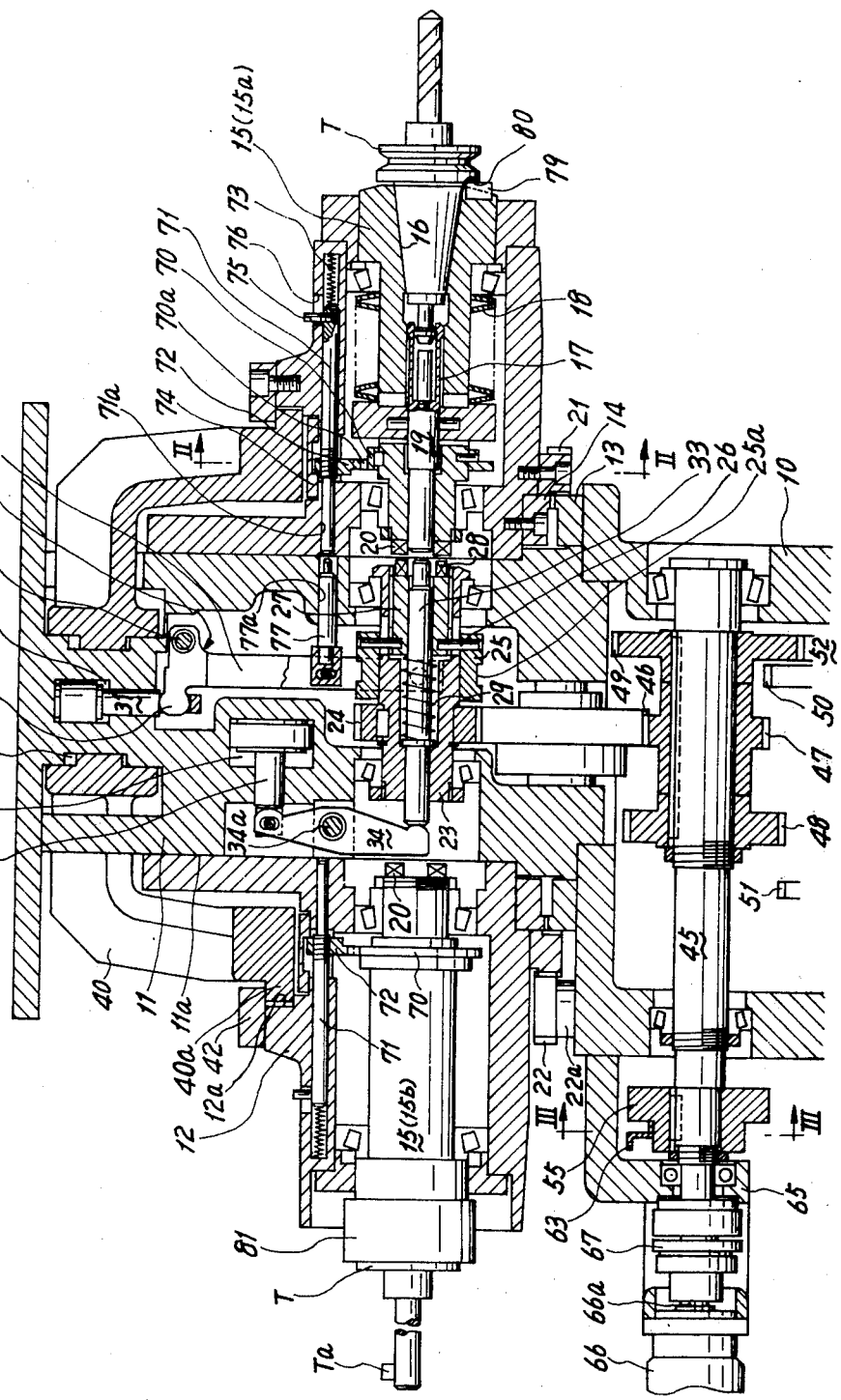
FIG. 1 is a vertical sectional view of a preferred embodiment of the invention.

Referring now to the drawings, and more particularly to FIG. 1 thereof, a so-called turret type machining center incorporating the present invention is shown in a vertical sectional view. As illustrated, the machining center is provided with a frame which includes an elevating head 10 slidably carried by the base, not shown, for vertical movement and a cylindrical center column 11 having an annular bearing surface 11a on its periphery and fixedly mounted on the elevating head 10. A turret head 12 is slidably carried by the bearing surface 11a on the center column 11 for rotatable movement about a vertical axis and vertical movement relative to the center column 11. For removably and firmly seating the turret head 12 on the elevating head 10, fixed on a lower surface of the turret head 12 there is an annular tooth member 14 adapted to removably engage with another similar tooth member 13 fixed on a top surface of the elevating head 10. Both of these tooth members 13 and 14 are concentrically disposed around the cylindrical center column 11 and are respectively formed with a circular array of gear teeth in a complementary relationship on the confrontation sides.

The turret head 12 is disposed to rotatably support a plurality of tool spindles 15, each of which is radially extending therethrough at angularly regular intervals and adapted to hold a tool, such as a drill, tap, reamer, milling tool, boring tool, or similar tool, at its outward or forward end. The turret head 12 is indexable to selectively position any one of the tool spindles 15 to an operative position where the tool spindle 15a is shown positioned, in FIG. 1. To accomplish indexing movement of the turret head 12, there is provided an indexing mechanism as will hereinafter be explained. Concentrically fixed on the lower surface of the turret head 12 is a ring gear 21 which is always engaged with a spur gear 22, the input shaft 22a of which is connected to an index motor, not shown, such as an electric or fluid motor, so as to be rotated thereby. Of course, it will be apparent that an indexing operation of the turret head 12 is performed under a condition that the turret head 12 is being lifted to disengage the tooth member 14 from the tooth member 13. To lift the turret head 12, a hanger bracket 40, which has formed on its lower periphery an outward extension 40a slidably engaged with a cooperating annular inner guideway 12a, which is formed by the top surface of the turret head 12 and an annular plate 42 secured thereon, is slidably carried by the center column 11 for vertical movement, and a lifting cylinder 41 active to effect the vertical movement of the hanger bracket 40 is presented by the center column 11. With this arrangement, the hanger bracket 40 may be lifted together with the turret head 12, and then the turret head 12 may be indexed by horizontal sliding movement relative to the hanger bracket 40 to position a preselected tool spindle 15 to the operative position.

One tool spindle 15a is particularly adapted to automatically hold and release the tool T. To accomplish this, the tool spindle 15a is provided with a tapered bore 16 for receiving the tool T and an automatic tool clamp mechanism, which comprises a split collet 17, a bevelled spring assembly 18 and a drawing rod 19 connected to the collet 17. The collet 17 is movable axially for releasably retaining the tool T in operative engagement with the tool spindle 15a and, normally, is resiliently biased toward an inner clamped position by means of the spring assembly 18 to retain the tool T in operative engagement with the tool spindle 15a. To release the collet 17, it is necessary to urge the drawing rod 19 axially forward against the spring assembly 18 for moving the collet 17 into a released position. To transmit a driving power from the tool spindle 15a to the tool T inserted therewithin, the tool spindle 15a has fixedly secured to its forward end surface a drive key 79 adapted to engage with a driven recess or keyway 80 which is presented by each of the tools T.

The other tool spindles 15, such as the tool spindle 15b, are adapted to fixedly support the tools T. More particularly, the tool T is fixedly clamped within the tool spindle 15b by means of a lock nut 81. To permit exchange of the tool T, therefore, it is necessary to completely remove the lock nut 81 from the tool spindle 15b with manual operation.

Each tool spindle 15 has formed on its rear end a first toothed coupling member 20, such as a pair of driven recesses, adapted to be selectively engaged with a second toothed coupling member 28, such as a pair of drive keys, which will hereinafter be more fully explained.

A rotatable sleeve 23 is rotatably supported within the center column 11 in an axial alignment with the tool spindle 15 positioned at the operative position. A coupling support member 27, having at the forward end thereof the second toothed coupling member 28 associated with the first toothed coupling member 20, is slidably inserted into the rotatable sleeve 23 in a splined connection with the internal surface of the rotatable sleeve 23. For the purpose of effecting the movement of the second toothed coupling member 28 into and out of engagement with the first toothed coupling member 20, an annular shifter 25 formed with an annular recess 25a on the periphery thereof is slidably supported on the periphery of the rotatable sleeve 23. The shifter 25 and the coupling support member 27 are interconnected, in a manner to effect bodily movement, by means of pins 26 disposed through a cutout axially extended on the rotatable sleeve 23. A bell crank lever 32 having a forked end 32a and a rounded end 32b is journalled to pivot about a shaft 32c secured to the center column 11. The forked end 32a is engaged within the annular recess 25a for preventing the shifter 25 from moving axially relative thereto but permitting the shifter 25 to rotate relative thereto, and the rounded end 32b is engaged with a piston rod 31 associated with a vertically disposed actuating cylinder 30. The cylinder 30 is actuated to effect the pivotal movement of the lever 32, whereby the coupling support member 27 is reciprocally moved to bring the drive keys 28 into and out of engagement with the driven recesses 20 of the tool spindle 15 positioned at the operative position.

To effect axial forward movement of the drawing rod 19 against the spring assembly 18, a push rod 33 is disposed to penetrate through the rotatable sleeve 23 and the coupling support member 27, and is normally urged into the retracted disengaged position thereof by means of a compression coil spring 29 seated within the rotatable sleeve 23. To effect forward movement of the push rod 33 into engagement with the drawing rod 19, a lever 34 is journalled to pivot about a shaft 34a secured to the center column 11, and is engaged at its one end with the rearward end of the push rod 33 and pivotally secured at its opposite end to a piston rod 36 associated with an actuating cylinder 35.

Within the elevating head 10 there is journalled a counter shaft 45 by spaced apart bearings in parallel relation with the rotatable sleeve 23. The counter shaft 45 has keyed on its periphery a high speed driven gear 47, an intermediate speed driven gear 48 and a low speed driven gear 49 which are disposed to be respectively engaged with shift gears 50, 51 and 52, shiftably splined to a shifter shaft, not shown, to which the driving power from a spindle drive motor, not shown, for example, a direct current motor, is transmitted via a clutch mechanism, not shown. It will be apparent that only one pair of the gears 47 and 50, 48 and 51 or 49 and 52 are meshingly interengaged to effect the appropriate and desired driving ratio of the counter shaft 45. Moreover, the high speed driven gear 47 is engaged with a counter gear 46 rotatably journalled within the center column 11, the counter gear 46 being engaged with a driven gear 24 which is fixedly secured on the periphery of the rotatable sleeve 23 and has the same number of teeth as the high speed driven gear 47, whereby the rotatable sleeve 23 is driven at the same speed ratio as the counter shaft 45.

On the center column 11, there is mounted an indexable tool storage magazine which has a plurality of tool storage sockets adapted to receive the tools T and which is disposed to be indexed so as to position the preselected tool storage socket to a tool change ready station. Each of the tool storage sockets is provided with a key, which is adapted to engage with the keyway 80 of the tool, in a predetermined angular position, such that when the tool storage socket is positioned at the tool change ready station, the key thereof and the keyway 80 to be engaged by the key, are always positioned in a predetermined angular position. Moreover, on the center column 11, there is a tool change mechanism for interchanging the tools T between the tool spindle 15a positioned at the operative position and the tool storage socket positioned at the tool change ready station. Inasmuch as the tool storage magazine and the tool change mechanism are not a part of this invention, these arrangements are not disclosed herein. However, it is noted that, during the tool change operation, the tool spindle 15a has to be positioned in a predetermined angular position in order to align the key 79 thereof in proper relationship to the key of the tool storage socket positioned at the tool change ready station.

In the case of a boring operation, as is well known in the art, it is necessary that, prior to withdrawal of the boring tool out of the bore of the workpiece, the boring tool is moved a sufficient distance in a radial direction relative to the bore in order that a bit of the boring tool does not make a tool mark on a finished surface of the bore when the boring tool is withdrawn out of the bore, and it is further necessary that, previously to the relative radial movement of the boring tool, the tool spindle 15 is positioned in a predetermined angular position such that the bit of the boring tool is positioned to permit the relative radial movement of the boring tool.

One of the principal advantages of this invention is the fact that the tool spindles 15 may be automatically positioned into the predetermined angular position.

To orient the coupling support member 27 in a predetermined angular position, this machining center is provided with an orienting mechanism.

An orienting motor 66, for example, a fluid motor, for effecting angular positioning movement of the coupling support member 27 is fixedly supported by a support 65 fixedly secured to the elevating head 10. An output shaft 66a of the motor 66 is connected to a rearward end of the counter shaft 45 through an electromagnetic clutch 67. Whenever it is desired to effect angular positioning of the coupling support member 27, the clutch 67 is operative in a well-known manner to transmit driving power from the output shaft 66a to rotate the counter shaft 45 together with the coupling support member 27.

Figure 3:
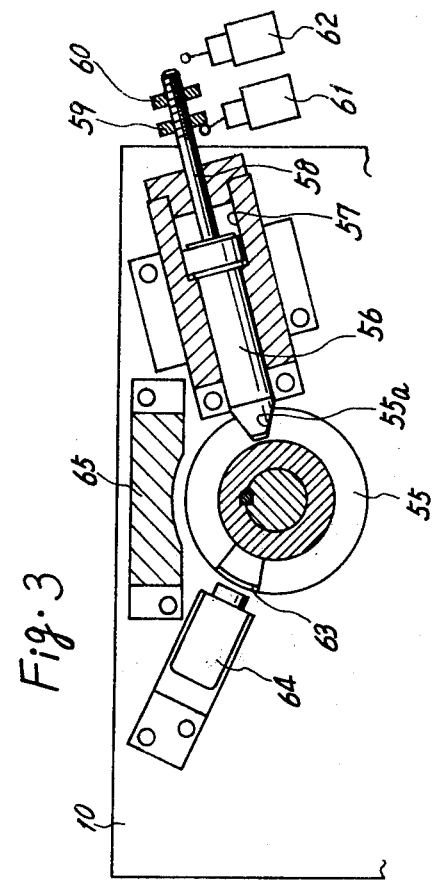
FIG. 3 shows a section of the apparatus of this invention taken along the line III—III of FIG. 1

An orienting stepped wheel 55 formed with a tapered notch 55a on its enlarged portion is fixedly secured to the rearward portion of the counter shaft 45, as shown in FIGS. 1 and 3. The notch 55a is adapted to be engaged by a plunger, such as a front piston rod 56 associated with an actuating cylinder 57 fixedly secured to the elevating head 10, whereby the coupling support member 27 together with the counter shaft 45 is oriented in such a predetermined angular position that the drive keys 28 of the coupling support member 27 are angularly aligned with the driven recesses 20 of the tool spindle 15, as will hereinafter be more fully explained, positioned at the predetermined angular position. On a rear piston rod 58 associated with the cylinder 57, two dogs 59 and 60 are adjustably disposed to respectively engage with limit switches 61 and 62. It will be apparent that whenever the cylinder 57 is actuated to urge the front piston rod 56 forwardly to effect engagement thereof within the complementary notch 55a, the dog 59 will actuate the limit switch 61. Conversely, whenever the cylinder 57 is actuated to urge the front piston rod 56 into the rearward retracted position thereof, the dog 60 will actuate the limit switch 62.

A switch actuating plate 63 is fixedly secured to the periphery of the reduced portion of the wheel 55. An approximate switch 64 associated with the plate 63 is supported on the elevating head 10 in a proper position such that the switch 64 is actuated by the plate 63 just before the piston rod 56 engages within the complementary notch 55a.

Within the turret head 12 there is provided an angular positioning mechanism for the exclusive use of each of the tool spindles 15 so as to maintain the tool spindle 15 in the predetermined angular position.

Figure 2:
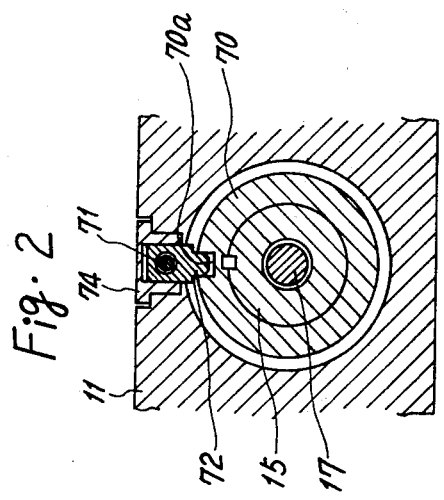
FIG. 2 is a section of the apparatus of this invention taken along the line II—II of FIG. 1.

A first engaging member 70, such as a circular plate 70 formed with a notch 70a on the periphery thereof, is fixedly mounted on the tool spindle 15, as shown in FIGS. 1 and 2, and a second engaging member comprising a guide rod 71 and a positioning member 72 fixedly secured to the guide rod 71 is slidably mounted within the turret head 12. The guide rod 71 is slidably carried within the bored opening 71a disposed within the turret head 12 in parallel relation with the tool spindle 15a and thereabove. The positioning member 72 is prevented from its rotation by a preventing member 74 fixedly secured within the turret head 12 and is adapted to engage with the notch 70a of the circular plate 70 so as to position the tool spindle 15a in the predetermined angular position. Axial movement of the positioning member 72 into and out of engagement with the notch 70a is also limited by the preventing member 74, whereby an inward end of the guide rod 71 is prevented from projecting out of the bored opening 71a.

A resilient element 73, such as a helical compression spring, carried within the bored opening 71a, is connected to normally urge the guide rod 71 to engage the positioning member 72 within the notch 70a of the circular plate 70.

In regard to each of the tool spindles 15 other than the tool spindle 15a, there is also provided the same angular positioning mechanism as above mentioned in regard to the tool spindle 15a, and thus the further explanation thereof may be omitted herein.

During rotation operation of a certain tool spindle 15 positioned at the operative position, the guide rod 71 in regard thereto has to be maintained in an outward or retracted position thereof in opposition to the spring 73 so as to disengage the positioning member 72 from the notch 70a of the circular plate 70. To accomplish this, a release mechanism, such as a release rod 77, is mounted within the center column 11. The release rod 77 is slidably carried within a bored opening 77a, which is disposed within the center column 11 in axial alignment with the bored opening 71a in regard to the tool spindle 15 positioned at the operative position and in parallel relation with the coupling support member 27. The release rod 77 is pivotally secured at one end thereof to the bell crank lever 32, and the opposite end thereof is opposed to the inward end of the guide rod 71. Accordingly, in the event that the cylinder 30 actuates the lever 32 to move the drive keys 28 into engagement with the driven recesses 20, the lever 32 moves also the release rod 77 out of the bored opening 77a, into the bored opening 71a and into abutting engagement with the guide rod 71, so that the guide rod 71 is urged in opposition to the spring 73 to disengage the positioning member 72 from the notch 70a of the circular plate 70. Conversely, in the event that the cylinder 30 actuates the lever 32 to move the drive keys 28 out of engagement with the driven recesses 20, the lever 32 moves also the release rod 77 into the retracted position in the bored opening 77a and out of the abutting engagement with the guide rod 71, so as to permit the spring 73 urging the guide rod 71 to engage the positioning member 72 within the notch 70a.

It is noted that the positioning member 72 has a sufficient axial width so that, when the cylinder 31 is actuated, the positioning member 72 is maintained engaged with the notch 70a of the circular plate 70 just before the drive keys 28 of the coupling support member 27 engage with the driven recesses 20 of the tool spindle and also disengage therefrom.

Furthermore, to permit slidable movement of the guide rod 71 manually, a manual operative lever 75, fixedly mounted on the guide rod 71 is projected beyond the turret head 12 through a slot 76 formed therein.

The above mentioned device operates in the following manner.

It will now be assumed that the turret head indexing operation has been completed and the preselected tool spindle 15a is therefore being positioned at the operative position, as shown in the drawings. It will be further assumed that each positioning member 72 is engaging with the notch 70a of the circular plate 70 to maintain each tool spindle 15 at the predetermined angular position and that the front piston rod 56 is engaging with the notch 55a of the orienting wheel 55 to orient the coupling support member 27 at the predetermined position.

Under these conditions, in the case of necessity, a tool change operation is performed. During the tool change operation, the cylinder 35 is actuated to release the tool T held by the tool spindle 15a from the split collet 17, and then the tool T is withdrawn from the tool spindle 15a and restored to the tool storage magazine by the tool change mechanism. Another tool T is withdrawn from the tool storage magazine and is inserted into the tool spindle 15a by the tool change mechanism. Because the tool spindle 15a is positioned at the predetermined angular position to position the key 70 thereof in proper relationship to the key of the tool storage socket of the tool storage magazine, such exchange of the tools T is performed without relative rotational movement between the tool spindle 15a and the tools T. Thereupon, the cylinder 35 is actuated to clamp the changed tool T inserted into the tool spindle.

Subsequently, the cylinder 30 is actuated to effect the counterclockwise pivotal movement of the lever 32 to urge simultaneously the coupling support member 27 and the release rod 77 into their rightward operative positions. Thus, the drive keys 28 of the coupling support member 27 are meshingly engaged with the driven recesses 20 of the tool spindle 15 and, successively, the positioning member 72 is disengaged from the notch 70a of the circular plate 70 of the tool spindle 15a. In this case, because the tool spindle 15a and the coupling support member 27 have been already positioned at their respective predetermined angular positions, such that the drive keys 28 are angularly aligned with the driven recesses 20 of the tool spindle 15a, the engagement between the drive keys 28 and the driven recesses 20 is performed with only an axial movement of the coupling support member 27.

Subsequently, the cylinder 57 is actuated to disengage the front piston rod 56 from the notch 55a of the orienting wheel 55. As this disengagement is confirmed by the limit switch 62, the machining operation is initiated. During the machining operation, only one pair of the gears 47 and 50, 48 and 51 or 49 and 52 are meshingly interengaged to drive the tool spindle 15a by means of the driving power from the spindle drive motor at the desired driving ratio. At the end of the machining operation, the operative connection between the gears 50, 51 and 52 and the spindle drive motor by the clutch mechanism is cut off, and the spindle drive motor is deenergized. At this moment, the electromagnetic clutch 67 and the orienting motor 66 are energized, so that the orienting rotation of the tool spindle 15a is initiated. As soon as the approximate switch 64 is actuated by the plate 63, the output rotating speed of the orienting motor 66 is reduced and, at the same time, the cylinder 57 is actuated to urge the front piston rod 56 forwardly. Thereupon, as the front piston rod 56 encounters the notch 55a of the orienting wheel 55, the front piston rod 56 engages therewithin so that the coupling support member 27 and the tool spindle 15a are respectively repositioned in their predetermined angular positions. As this is confirmed by the limit switch 61, the electromagnetic clutch 67 and the orienting motor 66 are deenergized.

In case of necessity, after this, a tool change operation and a machining operation are performed again by turns.

After the tool spindle 15a has been thus repositioned in the predetermined angular position, the cylinder 30 is actuated to effect the clockwise pivotal movement of the lever 32 to move simultaneously the coupling support memeber 27 and the release rod 77 into their retracted positions. Thus, the positioning member 72 is engaged within the notch 70a of the circular plate 70 of the tool spindle 15a and, successively, the drive keys 28 of the coupling support member 27 are disengaged from the driven recesses 20 of the tool spindle 15a.

Under these conditions, the turret head indexing operation for positioning another tool spindle 15, for example, the tool spindle 15b supporting a boring tool T, to the operative position is started. First, the cylinder 41 is actuated to lift the turret head, thus the tooth member 14 being disengaged from the other tooth member 13. Next the turret head 12 is rotated to position the tool spindle 15b to the operative position by the index motor via input shaft 22a, the spur gear 22 and the ring gear 21.

Thereupon, the cylinder 41 is actuated to lower the turret head 12 so that the tooth member 14 is meshingly engaged with the other tooth member 13.

Thus, the tool spindle 15a is moved away from the operative position. The tool spindle 15a is, however, maintained in the predetermined angular position owing to the positioning member 72 engaging the notch 70a of the circular plate 70.

At the completion of the turret head indexing operation, a subsequent machining operation or boring operation is initiated by the boring tool T supported by the tool spindle 15b through the process of the same operation as hereinbefore described. Upon arrival of the boring bit Ta of the boring tool T at a working end position in a finished bore of the workpiece at the end of the boring operation, the tool spindle 15b is oriented in the predetermined angular position by means of the engagement between the front piston rod 56 and the notch 55a of the orienting wheel, and then is relatively moved a slight distance in a radial direction opposite to the boring bit Ta in relation to the finished bore of the workpiece so as to keep the boring bit Ta from the finished surfae of the bore. After this, the boring tool T is withdrawn from the finished bore. In this case, the withdrawal of the boring tool T is performed without making a tool mark on the finished surface of the bore by the boring bit Ta.

After such machining operation, the turret head indexing operation for positioning another tool spindle 15 to the operative position is performed again with the condition of maintaining the tool spindle 15b at the predetermined angular position by means of the positioning member 72 and the notch 70a of the circular plate.

Although a certain specific embodiment of the invention has been shown and described, it is obvious that many modifications thereof are possible. It is to be understood, therefore, that within the scope of the appended claims, the invention may be practiced otherwise than as specifically described herein.

What is claimed as new and desired to be secured by Letters Patent of the United States is:

1. A machine tool having a frame, a turret head rotatably mounted upon the frame, a plurality of tool spindles rotatably supported within the turret head, index means for indexing the turret head to selectively position the tool spindles to an operative position, first coupling means provided upon each of the tool spindles, second coupling means slidably and rotatably provided upon the frame for rotating any one of the tool spindles positioned at the operative position when engaged with the first coupling means of the said any one of the tool spindles, and orienting means for positioning the second coupling means to a predetermined angular position, the improvement comprising:
   first engaging means provided upon at least a particular one of the tool spindles,
   second engaging means slidably mounted within the turret head and engageable with the first engaging means when the said one of the tool spindles is positioned to the predetermined angular position for maintaining the same thereat,
   means for moving the second engaging means into engagement with the first engaging means,
   release means operably disposed within the frame for moving the second engaging means out of engagement with the first engaging means against the last mentioned means when brought into abutting engagement with the second engaging means,
   a lever member operably supported and connected with the second coupling means and the release means for simultaneously moving the second coupling means and the release means respectively into engagement with the first coupling means and the second engaging means, and
   an actuator connected with the lever member for operating the same.

2. A machine tool as claimed in claim 1, further comprising:
   a preventing member mounted within said turret head for limiting movement of said second engaging means to prevent said second engaging means from entering within said frame.

3. A machine tool as claimed in claim 1, wherein:
   said first engaging means comprises a circular plate fixedly mounted upon said particular one of said tool spindles and having a notch at the periphery thereof; and
   said second engaging means comprises a guide rod slidably mounted in said turret head for axial movement in parallel with the axis of said particular one of said tool spindles and a positioning member fixedly mounted upon said guide rod for engaging with said notch of said circular plate.

4. A machine tool as claimed in claim 3, further comprising:
   a preventing member mounted within said turret head for limiting axial movement of said positioning member so as to prevent said guide rod from entering within said frame.

5. A machine tool as claimed in claim 4, wherein:
   said release means comprises a release rod slidably mounted within said frame in axial alignment with said guide rod associated with said particular one of said tool spindles positioned at the operative position.

6. A machine tool as claimed in claim 3, further comprising:
   an operative lever fixedly mounted on said guide rod and projecting beyond said turret head through a slot formed therein for permitting manual movement of said guide rod.

7. A machine tool as claimed in claim 1, wherein :
   said first coupling means and said second coupling means are both toothed coupling members engageable with each other; and
   said second engaging means is formed so as to be maintained engaged with said first engaging means just before a pair of said toothed members engage with each other and to engage with said first engaging means prior to disengagement of said toothed members from each other.

* * * * *